Sept. 6, 1949.  W. F. HESS  2,481,064
BRAKE BEAM

Filed April 19, 1946  4 Sheets-Sheet 1

INVENTOR.
Walter F. Hess.
BY Arthur N. Smith
Atty.

Sept. 6, 1949.　　　　　　W. F. HESS　　　　　　2,481,064
BRAKE BEAM
Filed April 19, 1946　　　　　　　　　　　　　　4 Sheets-Sheet 2
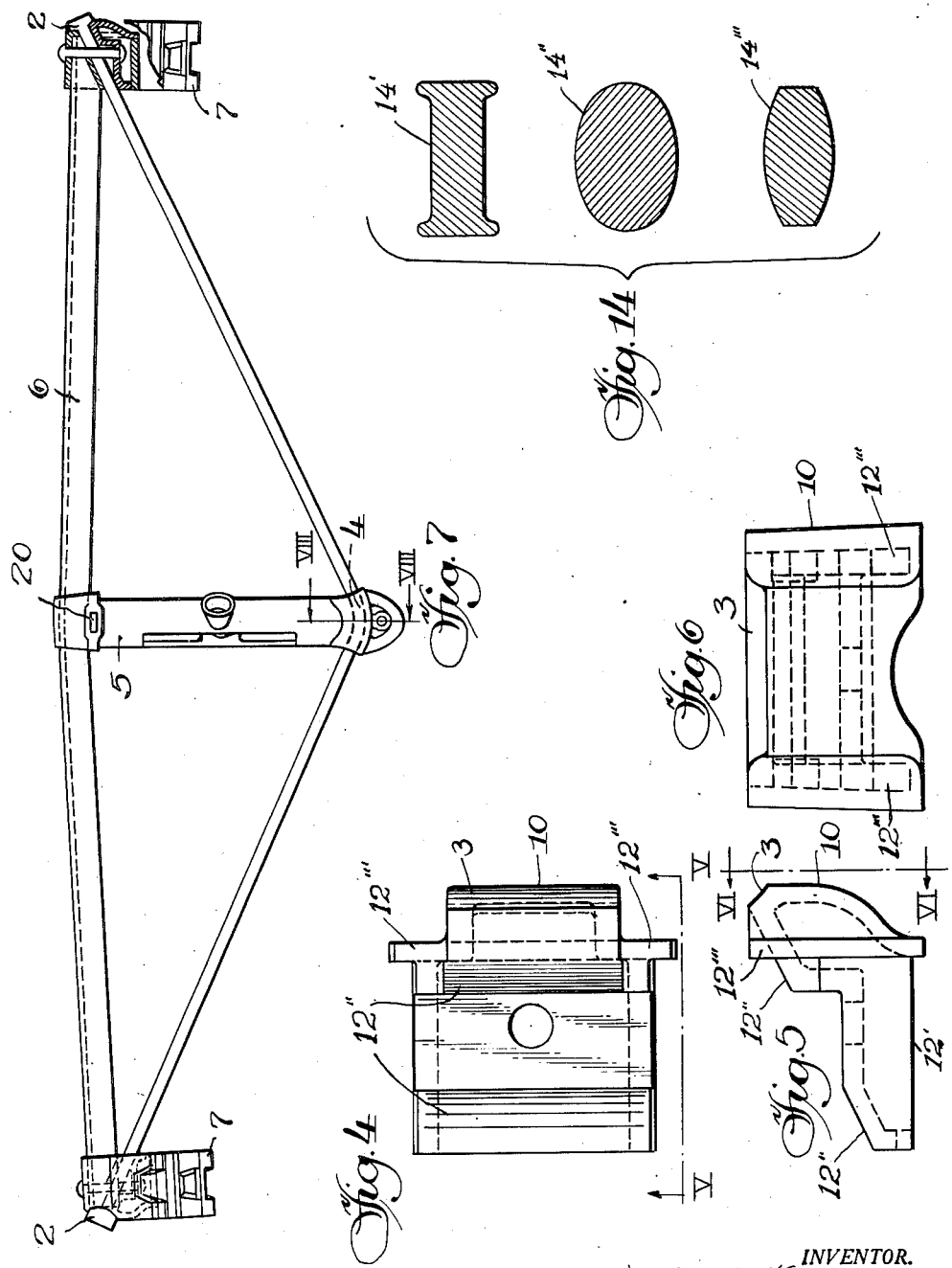

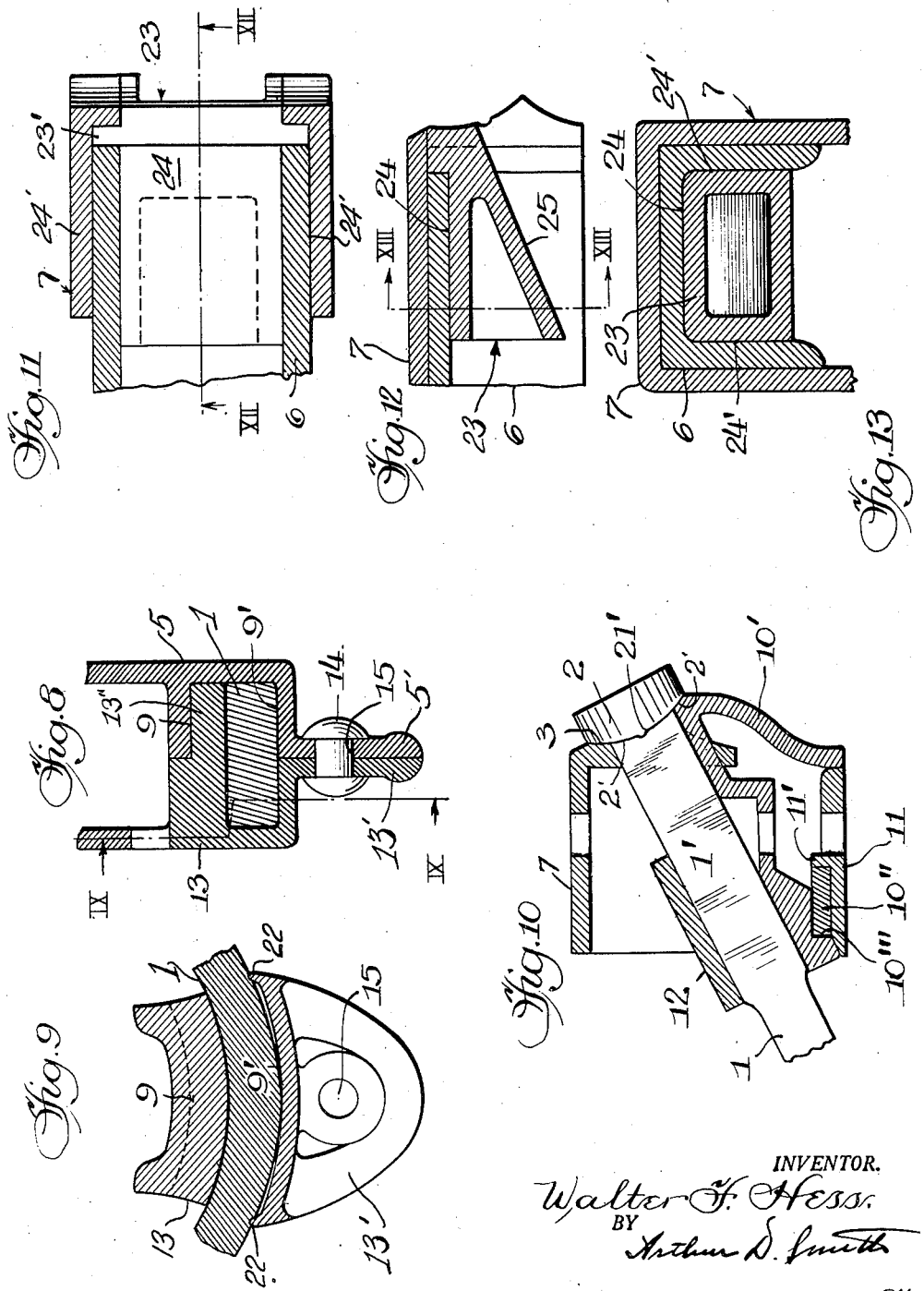

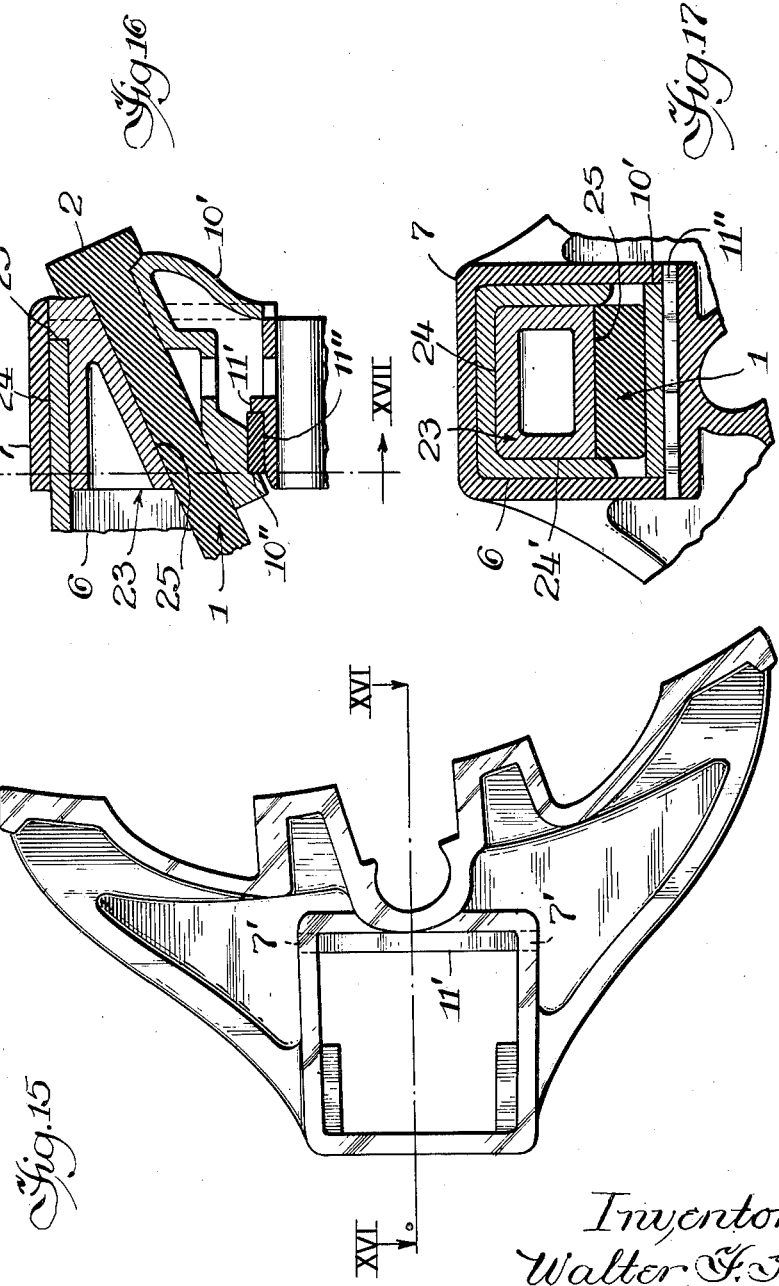

Patented Sept. 6, 1949

2,481,064

UNITED STATES PATENT OFFICE 2,481,064

BRAKE BEAM

Walter F. Hess, Chicago, Ill.

Application April 19, 1946, Serial No. 663,489

13 Claims. (Cl. 188—223.6)

The invention relates to improvements in brake-beams and more specifically to a truss type of beam comprising in combination brake-heads of novel design mounted on opposite ends of a connecting compression member, an interposed strut, and a tension rod of non-circular cross section passing over said strut and rigidly engaging the brake-heads through wedge members readily insertable in said heads.

A general object of the invention is to provide for a truss type of brake-beam capable of resisting the distortive tendency incident to the added burden of present day increased mileage, heavier rolling stock and longer trains.

Specific objects of the invention are to provide for a form of construction in which ease of fabrication is combined in an ultimate practically integral assembly of uniform resistance to stress; to provide for a truss construction in which the tension member, of non-circular cross section and unflexed at each end, is prevented from torsional movement and maintained at the optimum in tension with a flanged compression member on which the brake-heads are mounted through engagement with wedge members readily insertable in said brake-heads; to provide, as immediately corollary to the preceding, for preventing misalignment of brake-heads through torsional distortion of the tension member in a truss type of construction; to provide for brake-heads of conventional face for standard brake-shoe insertion, but fabricated with apertures for the respective introduction of the compression, tension and wedge members, and with engaging faces for such tension and wedge members adapted to effect a practically integral construction upon complete assembly; and to provide a strut interposed between the compression and tension members slotted to receive the tension and a compensating lock member, thus preventing a sliding and/or torsional engagement of said tension member with said strut.

Truss type brake-beams with round tension rods are well known and have given good service under light duty, but under the heavy stress and higher speeds of modern railroad practice there is a tendency for round rods to twist and/or the holding nuts at one or both ends to loosen, thus conducing to misalignment of the brake-heads and failure of the brake-shoe to properly contact the wheel. This may result, for example, in the engagement of one end of a brake-shoe with the flange of the adjacent wheel as a minor, and through further loosening of the rod, derailment as a major catastrophe.

The above described tendency to torsion in round tension rods with the operating dangers incident thereto has been overcome in the present invention by employing a tension rod of non-circular cross section, for example, of elliptical or polygonal form with the major axis of its cross sectional plane parallel to the plane of the web of the compression member; in short, a shape designed and aligned to resist the torsion moment. Any tendency to torsional deflection is further prevented by wedge members effecting positive pressure engagement of the tension member with the contact faces of the brake heads and the above mentioned strut.

An attempt to prevent distortion in a truss type of beam is disclosed in the prior art wherein a tension strap of rectangular cross section at the ends is employed, but such rod is flexed at each end adjacent its connection to the compression member and is further not locked to the strut.

Such flexed construction, with its inherent weakness at points of flexure and the possibility of slippage over the strut with attendant wear at such point and eventual easement of tension, is overcome in the present invention, wherein the long central axis of each tension leg obtains unflexed from the strut through its upset forged ends and head. Uniform unflexed tension is further ensured by the centrally disposed knuckle joint contact between the heads of the tension members and the corresponding brake-head and compensating wedge faces. Slippage of the tension member over the strut is prevented in the present invention by an interlocking means, thus removing any danger of wear at such point.

The above described improvements and others not previously mentioned will be more clearly understood by reference to the accompanying drawings, wherein like parts are numbered the same throughout and where:

Fig. 2 is a fragmentary cross section along the line II—II of Fig. 1 and further shows such section with compression, tension and wedge member assembled therewith; while

Fig. 4 is a top view detail of wedge member 10; while Fig. 5 is a side view of Fig. 4 along the line V—V.

Fig. 6 is an end view of the wedge member taken along the line VI—VI of Fig. 5; while Fig. 7 is an assembly of the entire beam.

Fig. 8 is a fragmentary detail of strut 5 along the line VIII—VIII of Fig. 7, showing strut lock riveted to the strut and embracing a tension rod of rectangular cross section; while Fig. 9 is a top view of the strut lock taken along offset line IX—IX of Fig. 8.

Figure 2:
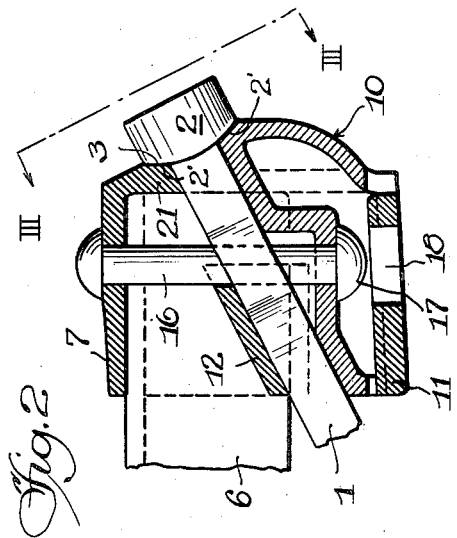
Figure 3:
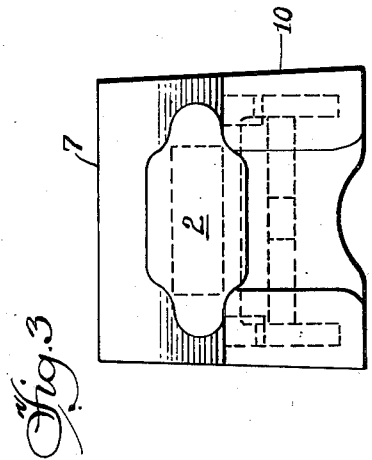
Fig. 3 is a plan view of Fig. 2 along the line III—III.

Fig. 10 represents a modification of the tension member and wedge member shown in Fig. 2; Fig. 11, a further modification, is a top view of an insertable upper wedge member disposed within a brake-head with the abutting walls of the latter and those of the embracing compression member appearing in cross-section; Fig. 12 is a sectional view of Fig. 11 along the line XII—XII; Fig. 13 a sectional view of Fig. 12 along the line XIII—XIII; while Fig. 14 illustrates cross sections of tension rods comprehended by the invention. Fig. 15 is a vertical elevation of the modified brake-head shown in cross-section in Fig. 11. Fig. 16 is a fragmentary cross-section along the line XVI—XVI of Fig. 15 and further shows such section with compression, tension and wedge members assembled therewith; while Fig. 17 is a fragmentary cross-section along the line XVII—XVII of Fig. 16.

Referring to the drawings and specifically to Fig. 2, 1 designates a non-circular type of tension rod, herein depicted of rectangular shape and forged at each end to a head or abutment 2 of larger cross section than the rod proper, such forged abutments being of a size to amply withstand the tension stress applied to the beam. The depressed spheroidal surface 3 in the brake-head face, corresponding to the convex surfaced shoulders 2' of tension rod abutment 2, affords a knuckle joint contact desirable to accommodate perfect alignment in the direction of unflexed tension pull; the tension rod after forging of the heads being bent cold midway at an obtuse angle as shown at 4 in Fig. 7.

Figure 1:
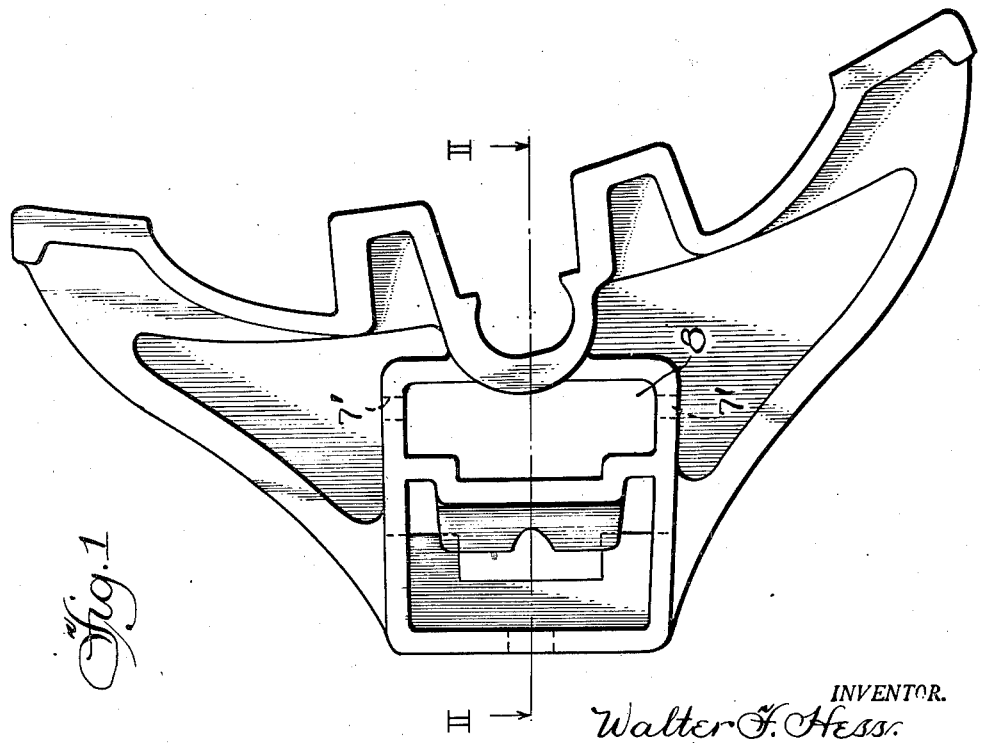
Fig. 1 is a vertical elevation taken on a plane at right angles to the car wheel axle and depicts a brake-head with conventional face for brake-shoe insertion, but adapted for use with the tension member subsequently to be described.

After strut 5 is secured to the compression member (herein depicted as the channel 6), camber is forced in such channel and while pressure is still exerted, the tension rod is placed across the depressed shelf 9 at top end of strut by sliding the rod in sideways, the strut lock 13 having been previously temporarily removed. The brake-heads 7 are then applied to the channel with the forged ends of the tension rod passing through the apertures 8 (Fig. 1), the depressed shelf 9 of the strut permitting each end of the tension rod to protrude nearly a half-inch beyond the normal rod seat; or in short, sufficient for insertion of the wedge member 10 through the opening in the end wall 21 of the brake-head. After the wedge member has been entered, pressure is simultaneously applied to each end of tension rod and exposed wedge surface, thus seating the abutment 2 of the rod against the curved surface seat 3, while at the same time freezing the wedge between the brake-head wall 11 and rod 1. In such freeze the bottom edges 12' of the wedge are forced against the brake-head wall 11 while the upper inclined surfaces 12" are also simultaneously forced against the surface 12 which is cast integral with the brake-head to accommodate the combination freeze of these several members; the wedge being strengthened by the flanges 12'''. This pressure action moves the obtuse angle bend of the tension rod against the upper shelf 9', permits insertion of the spacer projection 13" of the strut lock 13 between the rod and lower shelf 9, and in turn allows such embracing member to be secured in place with the rivet 14 inserted through the hole 15 which extends through the strut lug 5' and the strut lock lug 13'. This combination, when camber pressure is released, locks the various members together as if they were integrally cast or forged, and the wedge member 10 cannot be removed until the strut lock 13 is detached from strut. To further protect wedge member 10 against movement and maintain the frozen relationship between wedge, brake-head walls and tension rod, these members may be drilled and secured with a rivet 16 inserted through the opening 18 originally cored in wall 11. Finally a key is introduced through key-way 20 in the bottom end of the strut, thus anchoring the latter to the channel 6.

The inadequacy of round tension rods to withstand severe stresses has already been mentioned and an attempt to correct such fault has been the employment therewith of a concentric sleeve cast integral with the brake-head, but since such sleeve must be sufficiently large to admit the rod, only sliding and/or tangential contact is effected and not the positive pressure support achieved in my invention. This positive pressure affords the optimum in uniform tension, develops rigid reinforcement in a very vital area of the truss type brake-beam, all of which adds up to a stronger beam of longer life to say nothing of the advance in safety factor. Thus, the wedge member locked by the forged heads of the tension member, which in turn is locked to the strut, is a valuable contribution to operative safety. For example, if the seemingly impossible should happen in the shape of failure of both rod ends, the central section of the rod held by the strut could not work loose because of the overhang of the lips 22; nor (on account of the non-circular cross section) a broken rod could not pivot around the strut and swing loose with possible danger of car derailment.

For extremely severe service a modification of Fig. 2, similarly depicted in cross section, is shown in Fig. 10, wherein that portion of the tension rod 1' passing through the brake-head is upset in cross section over the main portion of the rod 1; the contact surface 12 of the brake-head with the rod sufficiently extended to embrace the entire upset portion; and the knuckle joint contact between tension rod head improved by a centrally cast recess at 21', this latter ensuring perfect seating if there is any slight central irregularity or flash at the base of the tension rod head incident to die forging. The wedge member 10' shown in Fig. 10 is further slightly modified to include a key-way 10'' having a contact lug 10'''. A key 11'' of conventional flat type, also engages the lug 11' cast in the frame 11 and when driven home (through suitably located slots in the brake-head, as indicated at 7' in Figs. 1 and 15) forces the wedge member 10' tightly against the front side of the tension rod; the key 11'' being shown in position in Figs. 16 and 17. This action, plus the general increased contact surface between the tension rod and brake-head, spells for the optimum in positive engagement and stress absorption. The above mentioned key may be used in place of rivet 16, or in conjunction therewith.

Finally in lieu of the inclined engaging surface 12 integrally cast with the brake-head, the insertable upper wedge member shown in Fig. 11 may be employed, this simplifying the casting of the brake-head especially as to coring of the latter which form of head is shown in Fig. 15. The application of such insertable upper wedge member, whose top view is shown in Fig. 11 together with abutting sections of brake-head and compression member (channel 6) lying in such plane, will be apparent from the sectional elevation shown in Fig. 12 taken along the line XII—XII of Fig. 11 and from the sectional view Fig. 13 taken along the line XIII—XIII of Fig. 12; also in greater detail in the assembly depicted in Figs. 16 and 17. It will be evident from these five views that the flange 23' of the insertable upper wedge 23 respectively engages the end of the channel 6 (flange and web), the inner top, and the back wall of the brake-head; that the upper surface 24 of the wedge 23 and the side walls 24' of the wedge engage the inner surface of the channel 6; and that the bottom surface of bottom portion 25 will engage the tension rod when the latter is in position. The front surface of the tension rod will be engaged by the inclined surface of the lower insertable wedge member 10' and the assembly further locked with driving home of the key 11'', while surface 23 of the wedge head and surface 3 of the brake head will be under the tensional pressure of the aforesaid rod.

The two insertable wedge members act as angular anchors for alignment of compression and tension members and produce a very rigid and practically integral beam without departing from the basic improvement of tensional pull in a straight line from strut to brake-head. The snugness of fit of the top portion 24 and side walls 24' of the upper wedge member with the channel increases twist or torsional resistance, such advantage being particularly beneficial where the length of strut 5 is increased and an angle of greater magnitude exists between tension and compression members in the brake-head.

The use of two insertable wedge members, in addition to simplifying the casting of the brake-head, also lends itself more readily to the employment of tension members of non-circular cross section other than rectangular, as for example, the shapes (bulbous rectangular 14', elliptical 14'' and fore-shortened elliptical 14''') shown in Fig. 14; it being easier to cast or forge the corresponding engaging surfaces in the wedges than in the larger brake-head.

While polygonal shaped tension rods of major-minor cross sectional axis relationship other than herein illustrated are comprehended by the present invention, I prefer to employ one of the simple shapes previously depicted as affording good wedge contact and adequate protection (with its major cross sectional axis at right angles to brake-beam pull) against tortional distortion.

Briefly summarizing: some of the improvements of the invention comprise retaining the conventional shoe contour, but providing an aperture in the brake-head for insertion of tension rod and wedge members; the securing of the forged head tension member in such positive engagement between the wedge members and in such tension that a holding rivet is of secondary importance; the development of tension in a straight axial line from strut through tension rod head with complete absence of flexure at brake-head; the employment of a tension member of non-circular cross section in such position that its major cross sectional axis is at right angles to the brake-beam pull; the locking of the tension rod at the strut; and providing wedge members acting as anchors for alignment of compression and tension members. Other improvements in the present invention will doubtless suggest themselves to one skilled in the art.

The invention is not limited to exact arrangement, size relationship, nor angles of the parts herein illustrated which illustrates one embodiment only of the invention. What I claim as new and desire to protect by Letters Patent is:

1. In a brake-beam of the type comprising a strut member extending in the direction of the applied load; a compression member engaged at its mid-point by said strut; a tension rod member engaging the end of said strut remote from said compression member and extending from said strut engagement diagonally to the ends of said compression member; and a brake-head member at each end of said compression member; the combination of: integral abutments at the extreme ends of said tension rod defining shoulders for receiving the tension load; said tension rod having adjacent said shoulders opposite faces parallel to the tension rod axis and to each other; gripping means for engaging said tension rod faces adjacent said shoulders; and abutment means for receiving said shoulders; said gripping means and abutment means being carried by each said brake-head; said gripping means including a wedge member having part of said abutment means formed on its outer end and receiving the thrust of said shoulders, whereby a friction grip on said rod surfaces is generated by the tension in said tension rod which develops transverse compression stress in said rod adjacent said shoulders; said tension rod having a bight at the end of said strut; said strut having locking means for engaging said bight; and said locking means being adapted to be changed from tensioned position to a withdrawn position to permit said tension rod abutments to move beyond assembled position and leave clearance for the insertion of a said wedge member.

2. A combination according to claim 1 in which said strut locking means includes an integral lower and an upper shelf shaped to leave a lateral opening for sidewise insertion of said bight between said shelves; and a strut lock member shaped to close said opening; said strut lock member having a spacer projection adapted to fit between said bight and said lower shelf when said bight is moved to tensioned position.

3. In a brake-beam of the type comprising a compression member; a strut member extending in the direction of the applied load and engaging said compression member at its mid-point; a tension rod member engaging the end of said strut remote from said compression member and extending from said strut engagement diagonally to the ends of said compression member; and a brake-head member at each end of said compression member; the combination of: abutments at the extreme ends of said tension rod defining shoulders for receiving the tension load; said tension rod extending from said shoulders to said strut member substantially in a straight line; said tension rod having adjacent said shoulders opposite flat faces parallel to the tension rod axis and to each other; gripping means for gripping said flat tension rod faces adjacent said shoulders; and abutment means for engaging said shoulders; said gripping means and abutment means being carried by said brake-head and having wedging contact with said brake-head, whereby a friction grip on said rod surfaces is maintained by the tension in said tension rod.

4. In a brake-beam of the type comprising a compression member; a strut member extending in the direction of the applied load and engaging said compression member at its mid-point; a tension rod member engaging the end of said strut remote from said compression member and extending from said strut engagement diagonally to the ends of said compression member; and a brake-head member at each end of said compression member; the combination of: abutments at the extreme ends of said tension rod defining shoulders for receiving the tension load; said tension rod extending from said shoulders to said strut member substantially in a straight line; opposed gripping means for engaging said tension rod faces adjacent said shoulders; and abutment means for receiving said shoulders; said gripping means and abutment means being carried by said brake-head; one of said gripping and abutment means having faces engaging said brake-head in a plane substantially parallel to the face of said compression member, and faces engaging said tension rod in a plane parallel to the adjacent face of said rod; whereby a friction grip on said rod surface is maintained by the tension rod.

5. A combination according to claim 4 in which each brake-head has a socket receiving the adjacent end of said compression member.

6. A combination according to claim 5 in which said compression member has an end abutment surface for engaging said brake-head, said end abutment surface at least half surrounding the axis of said tension rod.

7. A combination according to claim 4 in which said gripping and abutment means includes a fixed gripping surface parallel to and engaging said tension rod on one side; and an opposed longitudinally movable wedge carrying an abutment at its outer end and engaging the said tension rod.

8. A combination according to claim 7 in which said fixed gripping surface is integral with said brake-head.

9. A combination according to claim 7 in which said brake-head has a socket receiving the end of said compression member; and said movable gripping surface is carried by a separate wedge member fitting at least a portion of the end of said compression member and compressed against said compression member by said brake-head.

10. In a brake-beam of the type comprising a compression member; a strut member extending in the direction of the applied load and engaging said compression member at its mid-point; a tension rod member engaging the end of said strut remote from said compression member and extending from said strut engagement diagonally to the ends of said compression member; and a brake-head member at each end of said compression member; the combination of: abutments at the extreme ends of said tension rod defining shoulders for receiving the tension load; said tension rod extending from said shoulders to said strut member substantially in a straight line; opposed gripping means for engaging said tension rod faces adjacent said shoulders; and abutment means for receiving said shoulders; said gripping means and abutment means being carried by said brake-head; one of said gripping and abutment means having faces engaging said brake-head in a plane substantially parallel to the face of said compression member and faces engaging said tension rod in a plane parallel to the adjacent face of said rod; whereby a friction grip on said rod surface is maintained by the tension rod; said tension rod being of rectangular cross-section at its ends and at said bight, with the longer sides of the rectangle perpendicular to the plane of the compression member and strut.

11. In a brake-beam of the type comprising a compression member; a strut member extending in the direction of the applied load and engaging said compression member at its midpoint; a tension rod member engaging the end of said strut remote from said compression member and extending from said strut engagement diagonally to the ends of said compression member; and a brake-head member at each end of said compression member; the combination of: abutments at the extreme ends of said tension rod defining shoulders for receiving the tension load; said tension rod extending from said shoulders to said strut member substantially in a straight line; opposed gripping means for engaging said tension rod faces adjacent said shoulders; and abutment means for receiving said shoulders; said gripping means and abutment means being carried by said brake-head; one of said gripping and abutment means having faces engaging said brake-head in a plane substantially parallel to the face of said compression member and faces engaging said tension rod in a plane parallel to the adjacent face of said rod; whereby a friction grip on said rod surface is maintained by the tension rod; said gripping and abutment means including a filler wedge nested in said compression member and engaging said tension rod on one side; and an opposing key wedge engaging said rod on the other side and nested in said brake-head.

12. In a brake-beam of the type comprising a compression member; a strut member extending in the direction of the applied load and engaging said compression member at its midpoint; a tension rod member engaging the end of said strut remote from said compression member and extending from said strut engagement diagonally to the ends of said compression member; and a brake-head member at each end of said compression member; the combination of: abutments at the extreme ends of said tension rod defining shoulders for receiving the tension load; said tension rod extending from said shoulders to said strut member substantially in a straight line; opposed gripping means for engaging said tension rod faces adjacent said shoulders; and abutment means for receiving said shoulders; said gripping means and abutment means being carried by said brake-head; one of said gripping and abutment means having faces engaging said brake-head in a plane substantially parallel to the face of said compression member and faces engaging said tension rod in a plane parallel to the adjacent face of said rod; whereby a friction grip on said rod surface is maintained by the tension rod; said gripping and abutment means including a filler wedge nested in said compression member and engaging said tension rod on one side; and an opposing key wedge engaging said rod on the other side and nested in said brake-head; and said filler wedge having a shoulder abutting an end face of said compression member.

13. In a brake-beam of the type comprising a compression member; a strut member extending in the direction of the applied load and engaging said compression member at its midpoint; a tension rod member engaging the end of said strut remote from said compression member and extending from said strut engagement diagonally to the ends of said compression member; and a brake-head member at each end of said compression member; the combination of: abutments at the extreme ends of said tension rod defining shoulders for receiving the tension load; said tension rod extending from said shoulders to said strut member substantially in a straight line; opposed gripping means for engaging said tension rod faces adjacent said shoulders; and abutment means for receiving said shoulders; said gripping means and abutment means being carried by said brake-head; one of said gripping and abutment means having faces engaging said brake-head in a plane substantially parallel to the face of said compression member and faces engaging said tension rod in a plane parallel to the adjacent face of said rod; whereby a friction grip on said rod surface is maintained by the tension rod; said gripping and abutment means including a filler wedge nested in said compression member and engaging said tension rod on one side; and an opposing key wedge engaging said rod on the other side and nested in said brake-head; and said wedges having abutment surfaces restraining said brake-head from movement in either direction along said compression member.

WALTER F. HESS.

REFERENCES CITED

The following references are of record in the file of this patent:

UNITED STATES PATENTS

| Number | Name | Date |
|---|---|---|
| 956,616 | Williams | May 3, 1910 |
| 974,797 | Huntoon | Nov. 8, 1910 |
| 2,255,131 | Stillwagon | Sept. 9, 1941 |